(12) United States Patent
Lee

(10) Patent No.: US 9,004,549 B2
(45) Date of Patent: Apr. 14, 2015

(54) LOCKING APPARATUS FOR CASE AND CASE HAVING THE SAME

(75) Inventor: Won-Il Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 198 days.

(21) Appl. No.: 13/555,952

(22) Filed: Jul. 23, 2012

(65) Prior Publication Data

US 2013/0093197 A1    Apr. 18, 2013

(30) Foreign Application Priority Data

Oct. 18, 2011   (KR) .......................... 10-2011-0106506

(51) Int. Cl.
| | |
|---|---|
| *E05C 1/04* | (2006.01) |
| *E05B 17/20* | (2006.01) |
| *E05B 15/00* | (2006.01) |
| *G06F 1/16* | (2006.01) |
| *E05B 15/04* | (2006.01) |

(52) U.S. Cl.
CPC ................ *E05B 17/2019* (2013.01); *E05C 1/04* (2013.01); *E05B 15/0053* (2013.01); *G06F 1/1635* (2013.01); *E05B 2015/0462* (2013.01); *E05B 2015/0468* (2013.01); *E05B 2015/0472* (2013.01); *Y10S 292/38* (2013.01)

(58) Field of Classification Search
USPC .......... 292/145, 150, 152, 302, 303, DIG. 16, 292/DIG. 37, DIG. 38
See application file for complete search history.

(56) References Cited

U.S. PATENT DOCUMENTS

| | | | | |
|---|---|---|---|---|
| 354,597 | A | * | 12/1886 | Crouch ........................... 292/20 |
| 697,599 | A | * | 4/1902 | Barrett ............................ 70/150 |
| 1,439,229 | A | * | 12/1922 | Cohon et al. .................... 292/27 |
| 2,118,729 | A | * | 5/1938 | Hogan ............................ 292/27 |
| 4,500,120 | A | * | 2/1985 | Ridgewell et al. .............. 292/19 |
| 5,737,808 | A | * | 4/1998 | Ikeda .......................... 24/115 G |
| 7,658,035 | B1 | * | 2/2010 | Lawrence ....................... 49/185 |
| 8,505,986 | B2 | * | 8/2013 | Sun ................................. 292/80 |
| 2005/0073283 | A1 | | 4/2005 | Friedli et al. |

FOREIGN PATENT DOCUMENTS

| | | |
|---|---|---|
| EP | 2 343 426 A1 | 7/2011 |
| KR | 10-2006-0011175 A | 2/2006 |
| KR | 10-2010-0047808 A | 5/2010 |

* cited by examiner

*Primary Examiner* — Mark Williams
(74) *Attorney, Agent, or Firm* — Knobbe Martens Olson & Bear LLP

(57) ABSTRACT

A locking apparatus for a case and the case having the same are disclosed. In one embodiment, the locking apparatus includes an operating knob formed at an external surface of the case and a latch connected to the operating knob and configured to slide with respect to the case. The latch may include i) a body portion connected to the operating knob, ii) an opposite wall portion having opposite walls which extend from a first side of the body portion, iii) a hitch member formed on a second side of the body portion, wherein the first and second sides are opposing each other, and iv) a reinforcing member disposed between the opposite walls.

18 Claims, 5 Drawing Sheets

LOCKING APPARATUS FOR CASE AND CASE HAVING THE SAME

CROSS-REFERENCE TO RELATED APPLICATION

This application claims priority to and the benefit of Korean Patent Application No. 10-2011-0106506, filed on Oct. 18, 2011, in the Korean Intellectual Property Office, the entire content of which is incorporated herein by reference.

BACKGROUND

1. Field

The described technology generally relates to a locking apparatus for a case and a case having the same, more particularly, to a locking apparatus for a case having an excellent dynamic sensitivity and a case having the same.

2. Description of the Related Technology

In general, a locking apparatus (e.g., a latch mechanism) allows detachment and attachment between a component (e.g., a battery pack) and a product (e.g., a computing device).

A variety of latch structures may be formed at the case which contains or is incorporated into a product or component such that the product and component can be detached when a user moves a knob of the latch.

SUMMARY

One inventive aspect is a locking apparatus of a case and a case having the same wherein a deformation caused by repeated uses of the latch by providing a reinforcing member to the latch is minimized and the deformation caused by the movement of and assembly of the latch can also be prevented.

Another aspect is a locking apparatus for a case which includes; an operating knob formed at the outside of the case; a latch connected with the operating knob formed at the inner side of the case and installed to be slidable with respect to the case; wherein the latch includes a body portion connecting to the operating knob, an opposite wall portion extending from an edge of one side of the body portion, a hitch member formed in the other side of the body portion and a reinforcing member disposed between the opposite wall portion.

In one embodiment, the reinforcing member includes a case formed to come in contact with both sides of the opposite wall.

The reinforcing member may be formed as an elliptical shape.

In one embodiment, the reinforcing member has a Z type formed continuously more than one time up and down.

The reinforcing member may contain at least any one selected from the group consisting of polycarbonate (PC), PolyOxyMethylene (POM) and ABC polycarbonate.

The opposite wall and the reinforcing member may be integrally formed.

The opposite wall portion may be formed to have a closed shape.

The locking apparatus may include a guide member fixed and installed within an inner surface of the case along the upper and the lower portions of the latch to guide the sliding of the latch.

A pair of outer protrusions may be formed at an outer side corresponding to the opposite wall portion and a protruding hitch portion is concavely formed toward the opposite wall portion side to engage with a pair of outer protrusion portions.

The center of the reinforcing member may be located in line with a pair of outer protrusions.

At least one protrusion spaced in a predetermined interval may be further formed at the inner side facing a guiding member.

At least one inner side protrusion may be formed at the inner side of the opposite wall portion.

A through-hole may be formed at the case of a region connected to the operating knob and the latch.

A hitch member moveable member may be formed at the case so that the hitch member is exposed to the outside of the case or is inserted into the inner portion of the case based on the sliding of the latch.

The body portion of the latch may be stepped to more protrude from the inner side of the case than the hitch member.

A unit, provided with a groove accommodating the hitch member at the position corresponding to the case and the hitch member of the latch, detaches the case from the unit according to the sliding operation of the latch.

A case having a locking apparatus includes a latch including a body portion connected with a operating knob, an opposite wall portion extending from an edge of one side of the body portion, a hitch member formed at the other side of the body portion, and a reinforcing member positioned between the opposite wall portion.

The operating knob is formed at an outer side of the case, and the latch is connected with the operating knob, and is formed at the inner side of the case to be slidable to the case.

The reinforcing member is formed to come in contact with both sides of the opposite wall portion.

The case may contain or be incorporated into a battery pack or a portable computer.

Another aspect is a locking apparatus for a case comprising: an operating knob formed at an external surface of the case; a latch connected to the operating knob and configured to slide with respect to the case; wherein the latch comprises i) a body portion connected to the operating knob, ii) an opposite wall portion having opposite walls which extend from a first side of the body portion, iii) a hitch member formed on a second side of the body portion, wherein the first and second sides are opposing each other, and iv) a reinforcing member disposed between the opposite walls.

In the above apparatus, the reinforcing member is configured to expand and contract based on pressure applied from the opposite wall portion. In the above apparatus, the reinforcing member has an elliptical shape. In the above apparatus, the reinforcing member has one of the following shapes: a "Z" shape, a ">" shape, a "<" shape and a zigzag shape. In the above apparatus, the reinforcing member is formed of at least one of the following: Polycarbonate (PC), PolyOxyMethylene (POM) and ABC polycarbonate. In the above apparatus, the opposite wall portion and the reinforcing member are integrally formed.

In the above apparatus, the opposite walls are connected to each other so that the opposite wall portion has a closed shape. The above apparatus further comprises a guide member fixedly formed in an inner surface of the case along upper and lower portions of the latch to guide the latch to slide therethrough.

The above apparatus further comprises: at least one outer protrusion formed at an outer surface of the opposite wall portion; and a protruding hitch portion protruding toward the opposite wall portion and configured to be engaged with the outer protrusion.

In the above apparatus, the center of the reinforcing member is substantially aligned with the outer protrusion. The above apparatus further comprises at least one protrusion spaced in a predetermined interval and formed along surfaces of the guiding member which face each other. The above apparatus further comprises at least one protrusion formed along inner surfaces of the opposite wall portion.

In the above apparatus, a through-hole is formed at a portion of the case which is connected to the operating knob and the latch. In the above apparatus, a hitch member moveable hole is formed at the case so that the hitch member is exposed from the case or is inserted into the case based on the sliding of the latch. In the above apparatus, the body portion of the latch is stepped to protrude more from the case than the hitch member.

In the above apparatus, a groove is formed in a device which is connectable to and detachable from the case, and wherein the groove is configured to accommodate the hitch member at the position corresponding to the case and the hitch member of the latch and to detach the case from the device according to a sliding operation of the latch.

Another aspect is a case having a locking apparatus, wherein the locking apparatus comprises: a body portion connected to the operating knob; an opposite wall portion having opposite walls which extend from a first side of the body portion; a hitch member formed on a second side of the body portion, wherein the first and second sides are opposing each other; and a reinforcing member disposed between the opposite walls.

In the above case, the reinforcing member has one of the following shapes: a "Z" shape, a ">" shape, a "<" shape and a zigzag shape. In the above case, the reinforcing member is configured to expand and contract based on pressure applied from the opposite wall portion. The case contains or is incorporated into a power supply device or a computing device which is connectable to or detachable from the power supply device.

BRIEF DESCRIPTION OF THE DRAWINGS

FIG. 4b is a cross sectional view showing B-B' in FIG. 4a.

DETAILED DESCRIPTION

Figure 1:
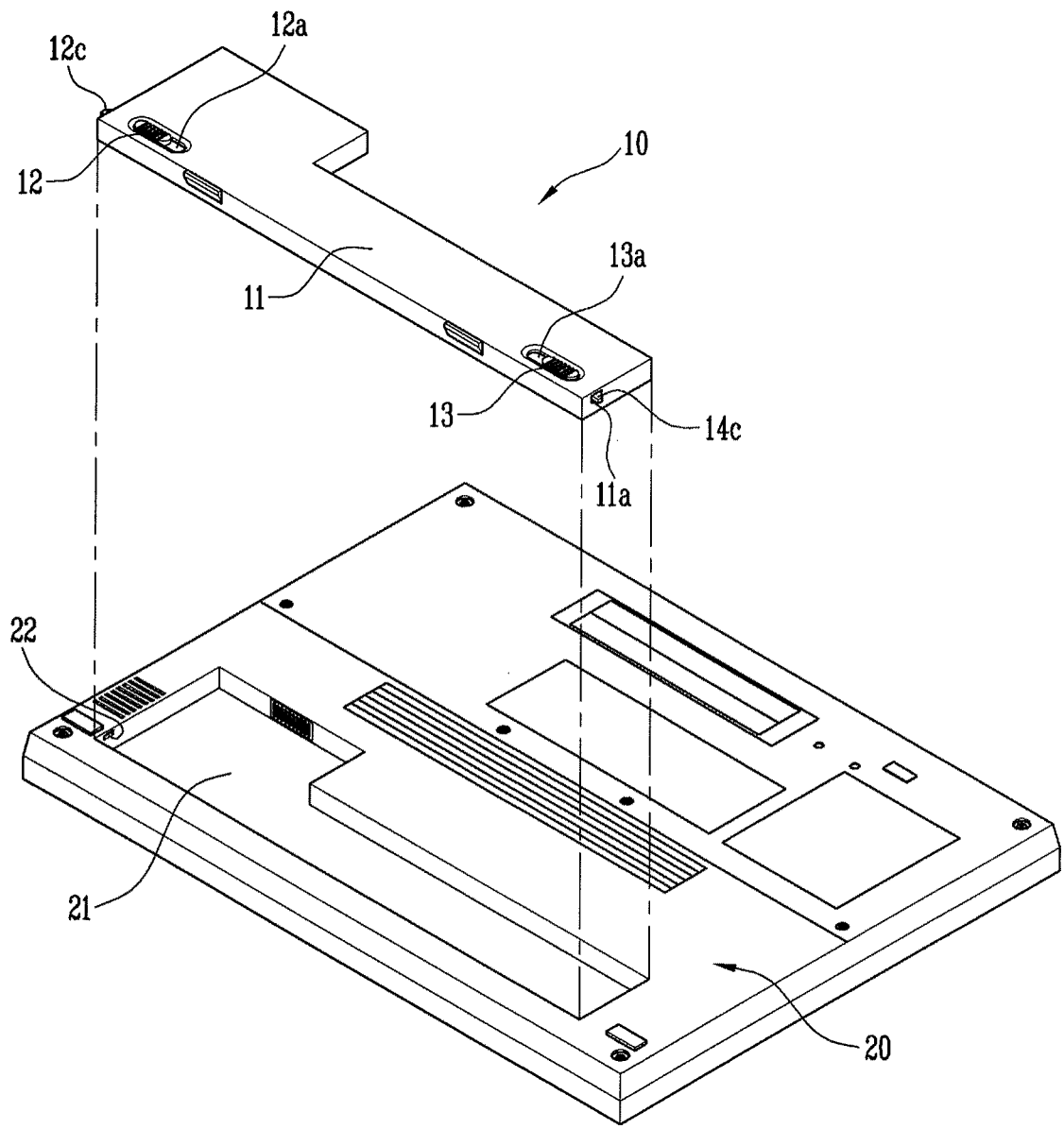
FIG. 1 is a perspective view showing a portable computer from which a battery pack is detached in accordance with one embodiment.

In the following detailed description, only certain embodiments have been shown and described, simply by way of illustration. As those skilled in the art would realize, the described embodiments may be modified in various different ways. Accordingly, the drawings and description are to be regarded as illustrative in nature and not restrictive. In addition, when an element is referred to as being "on" another element, it can be directly on that element or be indirectly on the element with one or more intervening elements interposed therebetween. Also, when an element is referred to as being "connected to" another element, it can be directly connected to that element or be indirectly connected to the element with one or more intervening elements interposed therebetween. Hereinafter, like reference numerals refer to like elements.

Figure 2:
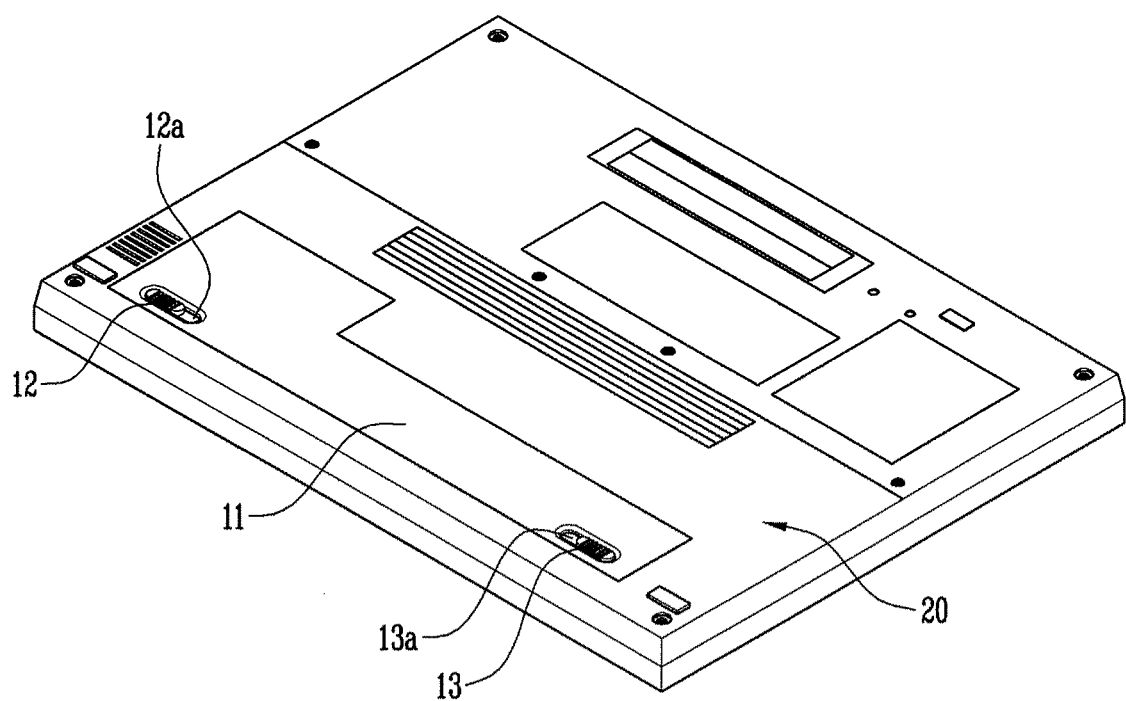
FIG. 2 is a perspective view showing a battery pack and a portable computer.

FIG. 1 is a perspective view showing a portable computer from which a battery pack is detached in accordance with one embodiment and FIG. 2 is a perspective view showing a battery pack and a portable computer.

Referring to FIGS. 1 and 2, a battery pack 10 may be seated at a back of a case of a portable computer 20. Although the portable computer 20 is illustrated, any other computing devices including, but not limited to, a tablet PC, a laptop, an e-book reader, an information terminal and a mobile terminal, can also be used. For the purpose of convenience, a portable computer is explained in this disclosure. Such a portable computer 20 and a battery pack 10 may be electrically connected via a connector (not shown).

A pair of slidable latches (see reference numerals 12d and 14 of FIG. 3) detachable from the portable computer 20 may be formed at the case 11 of the battery pack 10. In one embodiment, the latches 12d, 14 are connected to the operating knobs 12, 13 exposed from or formed on an external surface of the case 11 of the battery pack 10. Through-holes 12a, 13a may be respectively formed at an area of the case 11 connected to the operating knobs 12, 13 and the latches 12d, 14.

H itch members 12c, 14c formed on an external surface of the case 11 of the battery pack 10 or inserted into an inner portion of the case 11 are combined with the latches 12d, 14 according to the movement of the operating knobs 12, 13. Since the operating knobs 12, 13 and the latches 12d, 14 are combined, the hitch members 12c, 14c, connected to the latches 12d, 14, slidably move when the operating knobs 12, 13 move. A hitch member moveable hole 11a may be formed at the case, so that the hitch members 12c, 14c move in or out the case 11.

A groove 22 may be formed at the portable computer 20 of the position corresponding to the hitch members 12c, 14c. In this way, the portable computer 20 may be detached from the battery pack 10 depending on the sliding movement of the latches 12d, 14. When the portable computer 20 is combined with the battery pack 10, the hitch members 12c, 14c are exposed from the case 11 of the battery pack 10 to be inserted into the groove 22. Furthermore, when the battery pack 10 is detached from the portable computer 20, the hitch members 12c, 14c are released from the groove 22 and move into the inner portion of the case 11 of the battery pack 10.

The latches 12d, 14 mechanically or physically connect the battery pack 10 and the portable computer 20, and allow easy detachment and attachment between the elements 10 and 20. Generally, detachment of the battery pack 10 from the portable computer 20 is performed by a user's direct operation of the operating knob 12, 13. In this situation, the latches 12d, 14 may be desirable to have a balanced operational pressure. For example, when the latches 12d, 14 move too easily, the operating knobs 12, 13 may move even with a small shock or vibration, which can separate the battery pack 10 from the portable computer 20. In contrast, the user may find it inconvenient to use the latches 12d, 14 if they do not move well even with great force applied thereto.

In addition, if the latches 12d, 14 are deformed due to frequent uses, the deformation may adversely affect an operational strength or pressure of the latches 12d, 14, rendering them inoperable. In one embodiment, the above deformation can be minimized by improving the structure of the latches 12d, 14. The structure of the latches 12d, 14 will be described with reference to FIG. 3.

One embodiment improves the mechanical structure of the latches 12d, 14 to minimize the deformation caused by their repeated operation. The protrusions may be formed at the surface of the operating knobs 12, 13 to provide frictional force to prevent a user's finger(s) to slide.

In one embodiment, a pair of latches 12d, 14 are formed in different forms. One latch 12d may be operated in accordance with the elasticity of a spring and the other latch 14 may be manually operated.

If both of the latches 12d, 14 are elastically operated with a spring, when a user places the operating knobs 12, 13 at a latching releasing position, the user needs to use both hands. In this situation, it is not easy to detach the battery pack 10 from the portable computer 20. In other words, when a user releases the operating knob 12, 13, the latches 12d, 14 may fail to maintain a latching releasing position and tend to move back to the latching position by a restoring force. This causes a user inconvenience in detaching the battery pack 10 from the portable computer 20, since the user needs to hold the operating knobs 12, 13 to release the latching.

One embodiments provides an additional latch 14 in which the spring latch 12 is formed at one side thereof and the reinforcing member 16 (see FIG. 3) is formed at the other side thereof, thereby minimizing the deformation despite repeated operations of the latch 14.

The latches 12d, 14 may also be formed on a case of the portable computer 20. In this embodiment, a groove is formed to accommodate the hitch members 12c, 14c of the latches 12d, 14.

Figure 3:
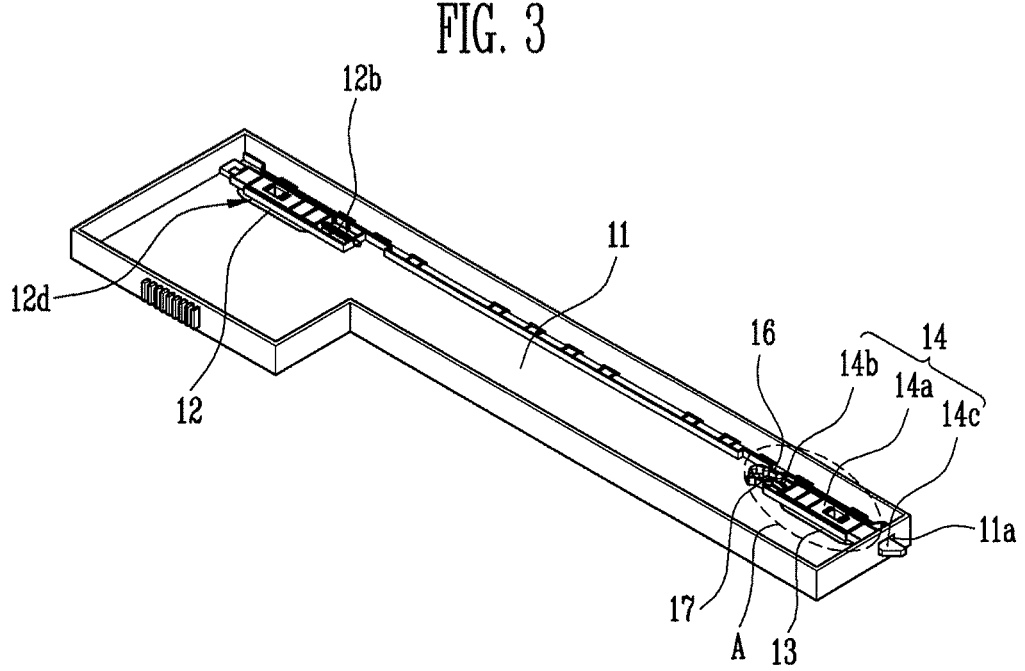
FIG. 3 is a plane view showing a inner surface of a case of a battery pack according to one embodiment.

FIG. 3 is a plane view showing an inner surface of a case of a battery according to one embodiment.

Referring to FIG. 3, as described above, the latch 14 is formed in the case 11 of the battery pack 10 to combine the portable computer 20 (see FIG. 1). The spring latch 12d may be formed at one side of the latch 14 and the reinforcing member 16 is formed at the other side of the latch 14.

In one embodiment, a locking apparatus includes the operating knob 13 formed at the outer side of the case 11 and the latch 14 connected to the operating knob 13 and formed at the inner side of the case 11. The latch 14 may be installed to slide on the case 11. Through-holes 12a and 13a may be formed at the case 11 of an area connected to the operating knob 13 and the latch 14.

In one embodiment, the latch 14 includes i) a body portion 14a connected to the operating knob 13, ii) an opposite wall portion 14b having opposite walls which extend from an edge of one side of the body portion 14a, iii) the hitch member 14c formed at other side of the body portion 14a and iv) the reinforcing member 16 positioned between the opposite walls.

In one embodiment, the reinforcing member 16 is formed to contact both sides of the opposite wall portion 14b and at this time, the reinforcing member 16 may be formed to have an elliptical shape (closed or open). The elliptical reinforcing member can provide a greater tension dispersion than a circular reinforcing member.

The reinforcing member 16 can prevent the deformation caused by repeated operations of expansion and contraction of the opposite wall portion 14b according to repeated slidings of the latch 14. The reinforcing member 16 may be manufactured integrally with the opposite wall portion 14a by a mold. In this way, the reinforcing number 16 serves to prevent structural deformation of the latch 14 by maintaining tension against the opposite wall portion 14b even if the reinforcing member 16 is repeatedly used for a long time. Therefore, an initial operational tension or elasticity may be maintained even under repeated operations and thus the production defects can be prevented.

In one embodiment, the opposite walls are connected to each other so that the opposite wall portion 14b has a closed shape. In this way, the reinforcing member has a stronger tension or elasticity within the opposite wall portion 14b.

In one embodiment, the reinforcing member 16 is formed of at least one of the following: polycarbonate (PC), PolyOxyMethylene (POM) and ABC polycarbonate. In another embodiment, the reinforcing member 16 is formed of other elastic materials. In addition, the hitch member moveable hole 11a may be formed at the case 11 so that the hitch member 14c formed at the other side of the body portion 14a is exposed from the case 11 or may be inserted into the inner portion of the case 11 according to the movement of the latch 14. The hitch member 14c is received by and fixed to the groove 22 (see FIG. 1) of the portable computer 20 which is combined with the battery pack 10 (FIG. 1).

Meanwhile, the spring latch 12d positioned at one side of the case 11 is installed within the case 11 to enable sliding movement by elastic force of the spring 12b. The spring 12b is fixed to the case 11 so that the hitch member 12c of the latch 12d applies the force to the direction toward the outer portion of the case 11.

Figure 4A:
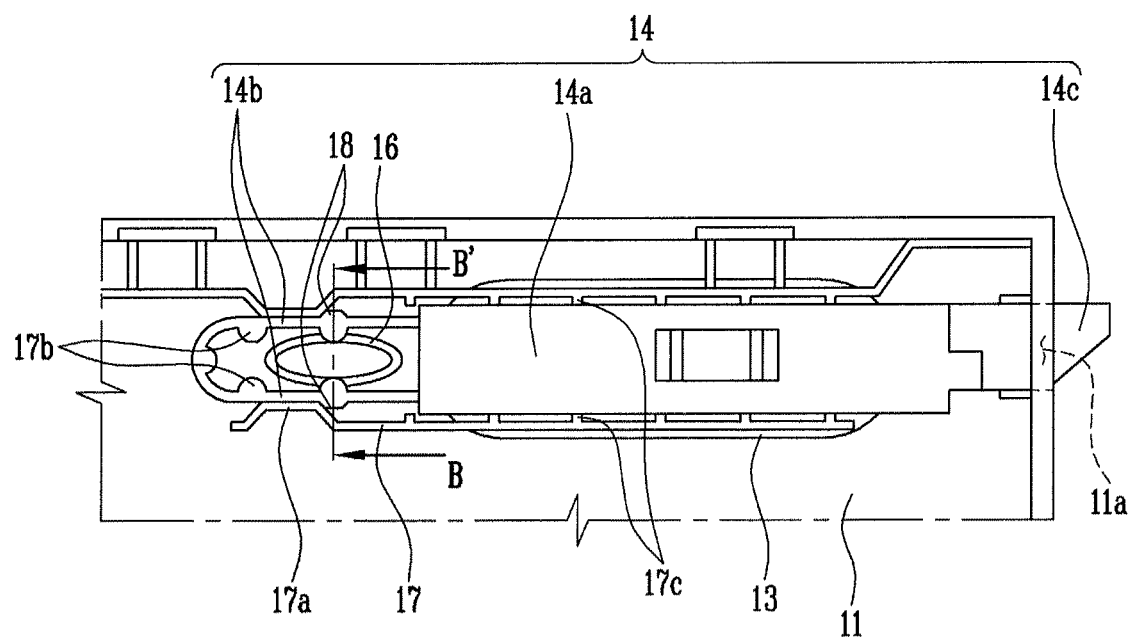
FIG. 4a is an enlarged view showing the A-portion in FIG. 3
Figure 4B:
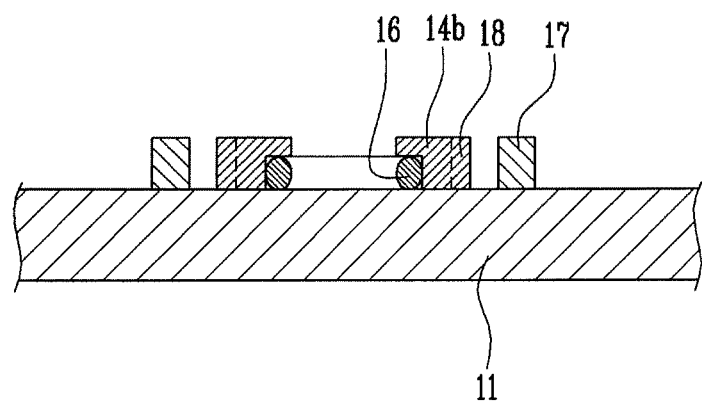

FIG. 4a is an enlarged view showing the A-portion in FIG. 3 and FIG. 4b is a cross sectional view showing B-B' in FIG. 4a.

In one embodiment, as shown in FIGS. 4a and 4b, a majority portion of the latch 14 of the locking apparatus of the case 11 is formed inside the case 11 and is installed to be slidable with respect to the case.

In one embodiment, the guide member 17 is fixed and installed along the upper and lower portions of the latch 14 to guide the sliding of the latch 14 toward the inner surface of the case 11. The guide member 17 may be made of material having a greater strength than that of the above-mentioned reinforcing member 16. In this way, when the reinforcing member 16 is slid toward the protruding hitching portion 17a formed at one area of the guide member 17, the elastic or springing operation can be made more smoothly.

One or more outer protrusions 18 may be formed at the outer side corresponding to the opposite wall portion 14b.

Furthermore, the protruding hitch portion 17a may be formed concavely toward the side of the opposite wall portion 14b and may be formed in the guide member 17. In this way, when the latch 14 is sliding by the operation of the operating knob 13, an outer protrusion 18 of the opposite wall portion 14b is engaged and disengaged with both sides of the protruding hitch portion 17a of the guide member 17. At this time, when the outer protrusion 18 moves to the protruding hitch portion 17a in both sides of the protruding hitch 17a, the opposite wall portion 14b is temporarily deformed by pressure (See FIG. 5A). The reinforcing member 16 installed between the opposite wall portion 14b is also temporarily deformed. In addition, when the outer protrusion 18 is positioned at one of both sides of the protruding hitch portion 17a, the opposite wall portion 14b and the reinforcing member 16 can be restored to their original shapes (See FIGS. 4A and 5B).

The center of the reinforcing member 16, to which the greatest pressure is applied, may be substantially aligned with at least one of the outer protrusions 18 so that the reinforcing member 16 can compensate for the deformation of the opposite wall portion 14b.

In addition, the facing inner sides of the guide member 17 further include at least one protrusion 17c formed in a predetermined interval. When the latch 14, in particular, the body portion 14a is sliding along the guide member 17, the protrusion 17c can reduce friction force between the guide member 17 and the body portion 14a by reducing the contact area. In this way, the operation of the latch 14 may be made more smoothly.

In addition, a least one inner side protrusion 17b is formed at the inner side of the opposite wall portion 14b. After the latch 14 is manufactured by the mold, the inner side protrusion 17b facilitates the withdrawal of the opposite wall portion 14b by pushing the opposite wall portion 14b using a push pin. That is, the inner side protrusion 17b provides manufacturing convenience, which may be omitted.

In one embodiment, the reinforcing member 16 and the inner side protrusion 17b are integrally manufactured by a mold. As shown in FIG. 4A, the inner side protrusion 17b extends from the opposite wall portion 14b to the reinforcing member 16 to provide a space capable of accommodating the reinforcing member 16 at the lower portion thereof. Therefore, the reinforcing member 16 may be maintained at a robust and stable position between the opposite walls by expanding the contact area between the reinforcing member 16 and the opposite wall portion 14b or the inner side protrusion 17b.

In addition, the body portion 14a of the latch 14 may be formed to have a step by protruding more from the inner surface of the case 11 than the hitch member 14c. The hitch member moveable hole 11a may be sized to allow the hitch member 14c to pass through. This prevents the body portion 14a to be exposed to the moveable hole 11a without a separate stopper.

Figure 5A:
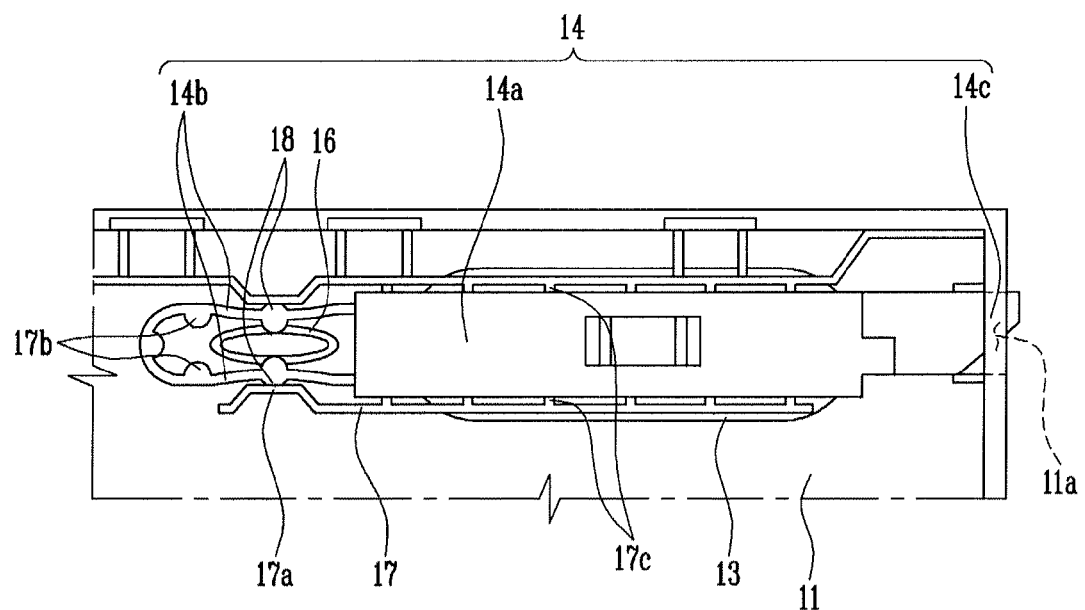
FIG. 5a and FIG. 5b are plane views showing a state in which a protrusion of a latch moves a hitch portion of a guide member according to one embodiment.
Figure 5B:
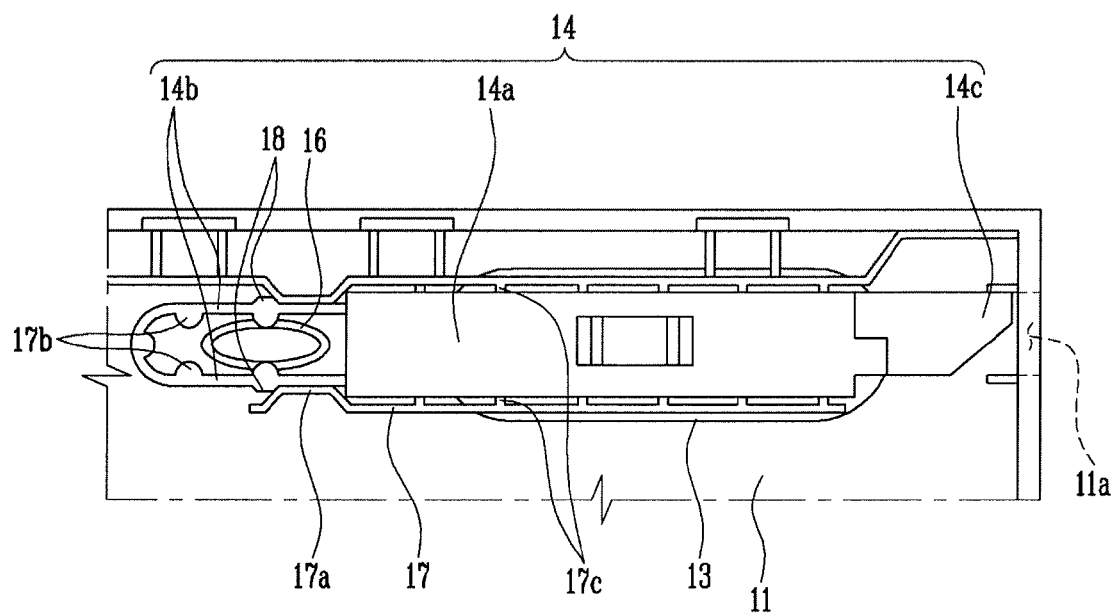

FIG. 5a and FIG. 5b are plane views showing a state in which a protrusion of a latch moves a hitch member of a guide member.

Referring to FIG. 5a, the latch 14 is slid along the guide member 17 by the operation of the operating knob 13 (see FIG. 1). At this time, when the outer protrusion 18 of the opposite wall portion 17b passes through the protruding hitch portion 17a of the guide member 17, the greatest pressure is applied to the opposite wall portion 14b so that the reinforcing member 16 is temporarily deformed.

The center of the reinforcing member 16 may be substantially aligned with at least one of the outer protrusions 18 so as to compensate deformation of the opposite wall portion 14b.

Referring to FIG. 5b, when the opposite wall portion 14b of the latch 14 passes through the protruding hitch portion 17a of the guide member 17, the pressure applied to the opposite wall portion 14b is released and the opposite wall portion 14b and the reinforcing member 16 are returned to their original shapes. In addition, the hitch member 14c connected to the other side of the latch 14 is inserted into the inner side of the case 11. In this case, the portable computer 20 (see FIG. 1) having the groove 22 (see FIG. 1) at the position corresponding to the case 11, and the hitch member 14c of the latch 14 is separate according to the sliding operation of the latch 14.

Figure 6:
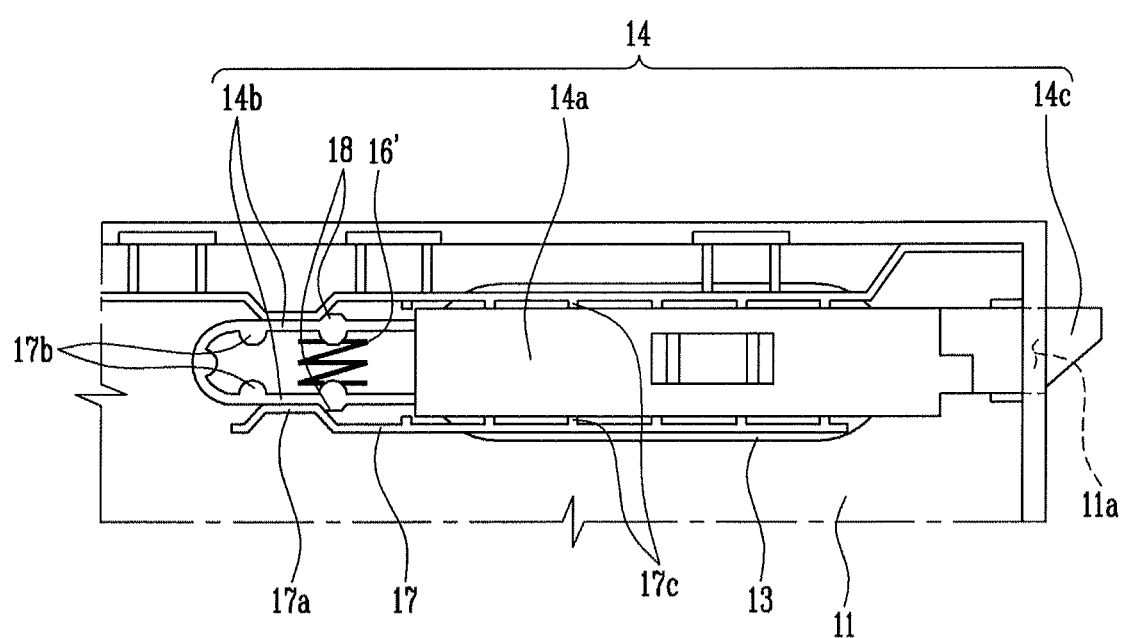
FIG. 6 is a plane view of an inner side of a battery pack according to another embodiment.

FIG. 6 is a plane view showing an inner surface of a case of a battery according to another embodiment.

In one embodiment, as shown in FIG. 6, a reinforcing member 16' has a zigzag shape which includes a plurality of alternating turns. In another embodiment, the reinforcing member 16' has a "Z" shape. In another embodiment, the reinforcing member 16' has a ">" or "<" shape having a single turn and having elasticity. In another embodiment, the reinforcing member 16' has a spring shape. The reinforcing member 16' can provide an elastic or springing operation like the elliptical reinforcing member 16 (see FIG. 3)

In one embodiment, the reinforcing member 16' is formed of at least one of the following: Polycarbonate (PC), PolyOxyMethylene (POM) and ABC polycarbonate. In another embodiment, the reinforcing member 16' is formed of other elastic materials. The reinforcing member 16' may have weaker rigidity than the guide member 17 so that the elastic or springing operation is performed smoothly.

Although the above embodiments show that the locking apparatus having the latch is formed in a battery pack, it may also be formed in the portable computer connected to the battery pack and is applicable to a variety of detachment structures.

According to at least one of the disclosed embodiments, by adding the reinforcing member to the latch, the deformation caused by the repeated operation of the latch may be minimized. Furthermore, even with repeated uses, the locking apparatus can maintain sufficient elasticity or tension operation.

While the above embodiments have been described in connection with the accompanying drawings, it is to be understood that the embodiments are not considered limiting and are intended to cover various modifications and equivalent arrangements included within the spirit and scope of the appended claims, and-equivalents thereof.

What is claimed is:

1. A case having a locking apparatus, the locking apparatus comprising:
an operating knob formed at an external surface of the case;
a latch connected to the operating knob and configured to slide with respect to the case, wherein the latch comprises i) a body portion connected to the operating knob, ii) a wall portion having opposite walls which extend from a first side of the body portion, iii) a hitch member formed on a second side of the body portion, wherein the first and second sides are opposing each other, and iv) a reinforcing member disposed between and surrounded by the opposite walls; and
a guide member fixedly formed in an inner surface of the case along upper and lower portions of the latch to guide the latch to slide therethrough, when the hitch member is inserted into the case to unlock the case and when at least a portion of the hitch member is exposed from the case to lock the case, wherein a groove is formed in a device which is connectable to and detachable from the case, and wherein the groove is configured to accommodate the hitch member at the position corresponding to the case and the hitch member of the latch and to detach the case from the device according to a sliding operation of the latch.

2. The case of claim 1, wherein the reinforcing member is configured to expand and contract based on pressure applied from the opposite walls of the wall portion.

3. The case of claim 1, wherein the reinforcing member has an elliptical shape.

4. The case of claim 1, wherein the reinforcing member has one of the following shapes: a "Z" shape, a ">" shape, a "<" shape and a zigzag shape.

5. The case of claim 1, wherein the reinforcing member is formed of at least one of the following: Polycarbonate (PC), PolyOxyMethylene (POM) and ABC polycarbonate.

6. The case of claim 1, wherein the wall portion and the reinforcing member are integrally formed.

7. The case of claim 1, wherein the opposite walls are connected to each other so that the wall portion has a closed shape.

8. The case of claim 1, wherein the locking apparatus further comprises:
at least one outer protrusion formed at an outer surface of the wall portion; and a protruding portion protruding toward the opposite walls and configured to be engaged with the outer protrusion.

9. The case of claim 8, wherein the center of the reinforcing member is substantially aligned with the outer protrusion.

10. The case of claim 1, further comprising at least one protrusion spaced in a predetermined interval and formed along surfaces of the guiding member which face each other.

11. The case of claim 1, further comprising at least one protrusion formed along inner surfaces of the wall portion.

12. The case of claim 1, wherein a through-hole is formed at a portion of the case which is connected to the operating knob and the latch.

13. The case of claim 1, wherein a hitch member moveable hole is formed at the case so that the hitch member is exposed from the case or is inserted into the case based on the sliding of the latch.

14. The case of claim 1, wherein the body portion of the latch is stepped to protrude more from the case than the hitch member.

15. A case having a locking apparatus, wherein the locking apparatus comprises:
a body portion connected to the operating knob;
a wall portion having opposite walls which extend from a first side of the body portion;
a hitch member formed on a second side of the body portion, wherein the first and second sides are opposing each other;
a reinforcing member disposed between and surrounded by the opposite walls; and
a guide member fixedly formed in an inner surface of the case to guide the wall portion to slide therethrough, when the hitch member is inserted into the case to unlock the case and when at least a portion of the hitch member is exposed from the case to lock the case, wherein a groove is formed in a device which is connectable to and detachable from the case, and wherein the groove is configured to accommodate the hitch member at the position corresponding to the case and the hitch member of the latch and to detach the case from the device according to a sliding operation of the latch.

16. The case of claim 15, wherein the reinforcing member has one of the following shapes: a "Z" shape, a ">" shape, a "<" shape and a zigzag shape.

17. The case of claim 15, wherein the reinforcing member is configured to expand and contract based on pressure applied from the wall portion.

18. The case of claim 15, wherein the case contains or is incorporated into a power supply device or a computing device which is connectable to or detachable from the power supply device.

* * * * *

UNITED STATES PATENT AND TRADEMARK OFFICE
CERTIFICATE OF CORRECTION

| | | |
|---|---|---|
| PATENT NO. | : 9,004,549 B2 | Page 1 of 1 |
| APPLICATION NO. | : 13/555952 | |
| DATED | : April 14, 2015 | |
| INVENTOR(S) | : Won-Il Lee | |

It is certified that error appears in the above-identified patent and that said Letters Patent is hereby corrected as shown below:

In the Specification

In column 3 at lines 45-46, Change "FIG. 3" to --FIG. 3.--.

In column 7 at line 64, Change "FIG. 3)" to --FIG. 3).--.

Signed and Sealed this
Twenty-ninth Day of March, 2016

Michelle K. Lee
*Director of the United States Patent and Trademark Office*